United States Patent
Chan et al.

(10) Patent No.: US 10,194,317 B2
(45) Date of Patent: Jan. 29, 2019

(54) METHODS AND SYSTEMS TO PERFORM AT LEAST ONE ACTION ACCORDING TO A USER'S GESTURE AND IDENTITY

(71) Applicant: PISMO LABS TECHNOLOGY LIMITED, Hong Kong (HK)

(72) Inventors: Alex Wing Hong Chan, Hong Kong (HK); Ming Pui Chong, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 229 days.

(21) Appl. No.: 15/118,892

(22) PCT Filed: Dec. 31, 2015

(86) PCT No.: PCT/IB2015/060074
§ 371 (c)(1),
(2) Date: Aug. 14, 2016

(87) PCT Pub. No.: WO2017/115117
PCT Pub. Date: Jul. 6, 2017

(65) Prior Publication Data
US 2018/0014187 A1    Jan. 11, 2018

(51) Int. Cl.
*G06F 21/00*    (2013.01)
*H04L 29/02*    (2006.01)
(Continued)

(52) U.S. Cl.
CPC ............ *H04W 12/06* (2013.01); *G06F 1/163* (2013.01); *G06F 3/017* (2013.01); *G06F 3/0346* (2013.01);
(Continued)

(58) Field of Classification Search
CPC .. H04W 12/06; H04L 63/083; H04L 63/0428; G06F 3/0346; G06F 3/017
See application file for complete search history.

(56) References Cited

U.S. PATENT DOCUMENTS

| 8,638,190 B1 | 1/2014 | Want et al. |
| 8,849,978 B1 * | 9/2014 | Batson ................. H04L 67/10 709/223 |

(Continued)

FOREIGN PATENT DOCUMENTS

| CN | 102591446 A | 7/2012 |
| CN | 103488290 A | 1/2014 |

(Continued)

OTHER PUBLICATIONS

International Search Report of International Application PCT/IB2015/060074, dated Sep. 22, 2016.
(Continued)

*Primary Examiner* — Lisa C Lewis
(74) *Attorney, Agent, or Firm* — Hershkovitz & Associates, PLLC; Abe Hershkovitz

(57) ABSTRACT

The present invention discloses methods and systems for performing at least one action at a system according to a user's gesture information. The required steps comprises of capturing the user's gestures information by a mobile apparatus, wherein the apparatus comprises an antenna, a processor, a storage medium, at least one accelerometer, wherein the accelerometer has at least 3 axis; comparing gesture information against one or more predefined gesture information at the mobile apparatus and when the gesture information matches a predefined gesture information, the mobile apparatus selects a first identity based on the predefined gesture information, sends encrypted information to a system through a reader wherein the encrypted information comprises the predefined gesture information, the first iden-
(Continued)

tity, a timestamp, and a device identity. The system performs at least one action according to the encrypted information. When the gesture information does not match any pre-defined gesture information, the mobile apparatus sends a failure notice to the user. The mobile apparatus or device does not send the encrypted information unless the device is physically close to the reader by a first wireless signal strength.

20 Claims, 14 Drawing Sheets

(51) Int. Cl.
| | |
|---|---|
| H04W 12/06 | (2009.01) |
| G06F 3/01 | (2006.01) |
| G06F 3/0346 | (2013.01) |
| H04L 29/06 | (2006.01) |
| G06F 1/16 | (2006.01) |
| G06F 21/31 | (2013.01) |
| H04L 9/32 | (2006.01) |
| G06F 3/0488 | (2013.01) |
| H04M 1/67 | (2006.01) |
| H04M 1/725 | (2006.01) |

(52) U.S. Cl.
CPC .......... *G06F 3/04883* (2013.01); *G06F 21/31* (2013.01); *H04L 9/3231* (2013.01); *H04L 63/0428* (2013.01); *H04L 63/083* (2013.01); *H04L 2209/805* (2013.01); *H04M 1/67* (2013.01); *H04M 1/7253* (2013.01)

(56) References Cited

U.S. PATENT DOCUMENTS

| | | | |
|---|---|---|---|
| 2007/0240182 A1* | 10/2007 | Callahan | H04N 5/44543 725/30 |
| 2013/0234836 A1* | 9/2013 | Davis | G06F 1/1626 340/10.5 |
| 2015/0065090 A1 | 3/2015 | Yeh | |
| 2015/0096042 A1* | 4/2015 | Mizrachi | H04L 63/0421 726/26 |
| 2015/0160731 A1 | 6/2015 | Yun et al. | |
| 2015/0334188 A1* | 11/2015 | Chiba | H04W 4/21 709/204 |
| 2017/0155645 A1* | 6/2017 | Wu | H04L 61/1511 |
| 2017/0169207 A1* | 6/2017 | Asnis | G06F 3/017 |

FOREIGN PATENT DOCUMENTS

| | | |
|---|---|---|
| CN | 104463152 A | 3/2015 |
| CN | 104834907 A | 8/2015 |
| CN | 104898473 A | 9/2015 |

OTHER PUBLICATIONS

Written Opinion of the International Searching Authority of International Application PCT/IB2015/060074, dated Sep. 22, 2016.

* cited by examiner

[Fig. 1A]
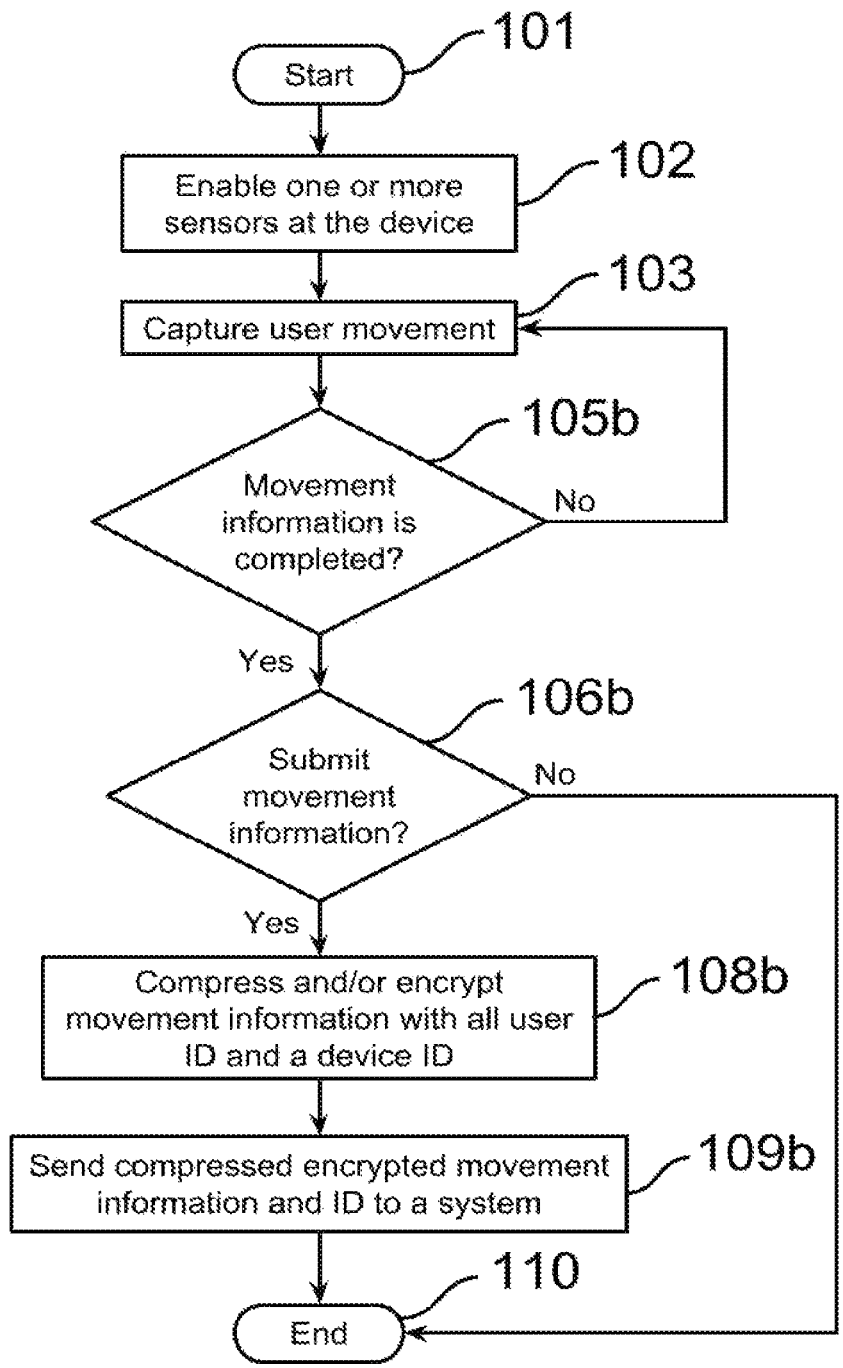

[Fig. 1B]
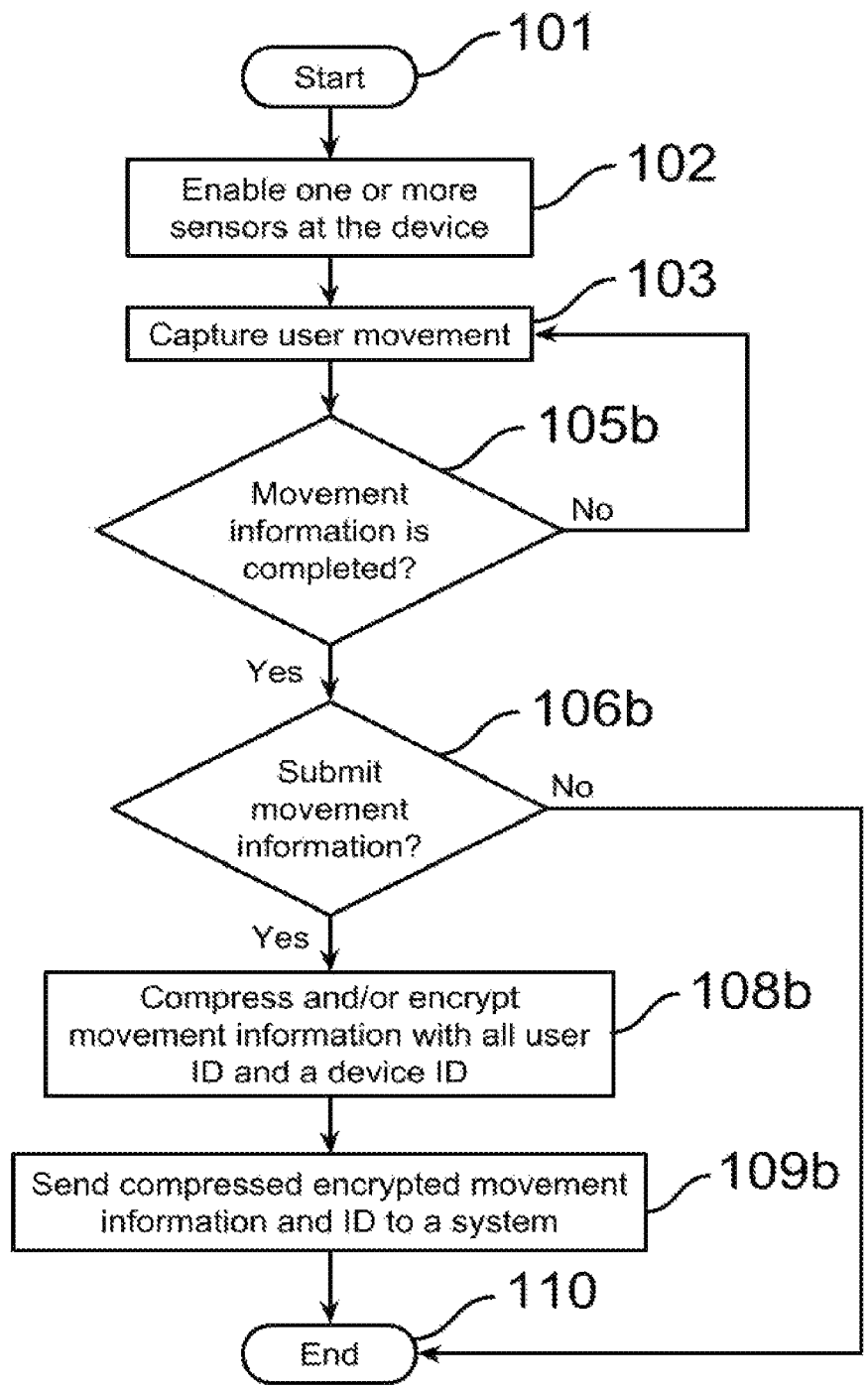

[Fig. 1C]
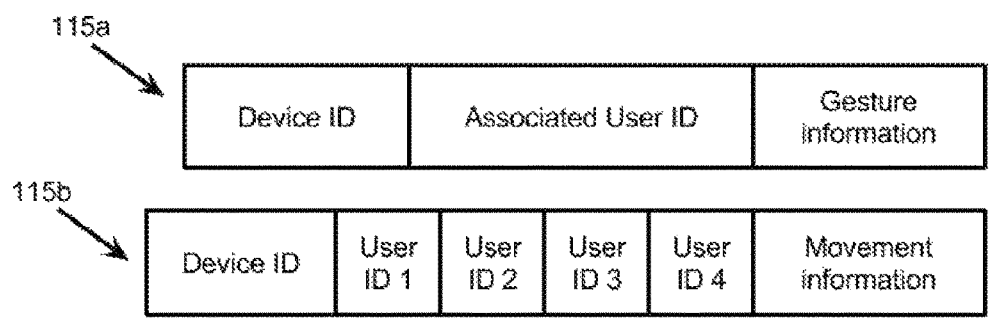

[Fig. 2A]
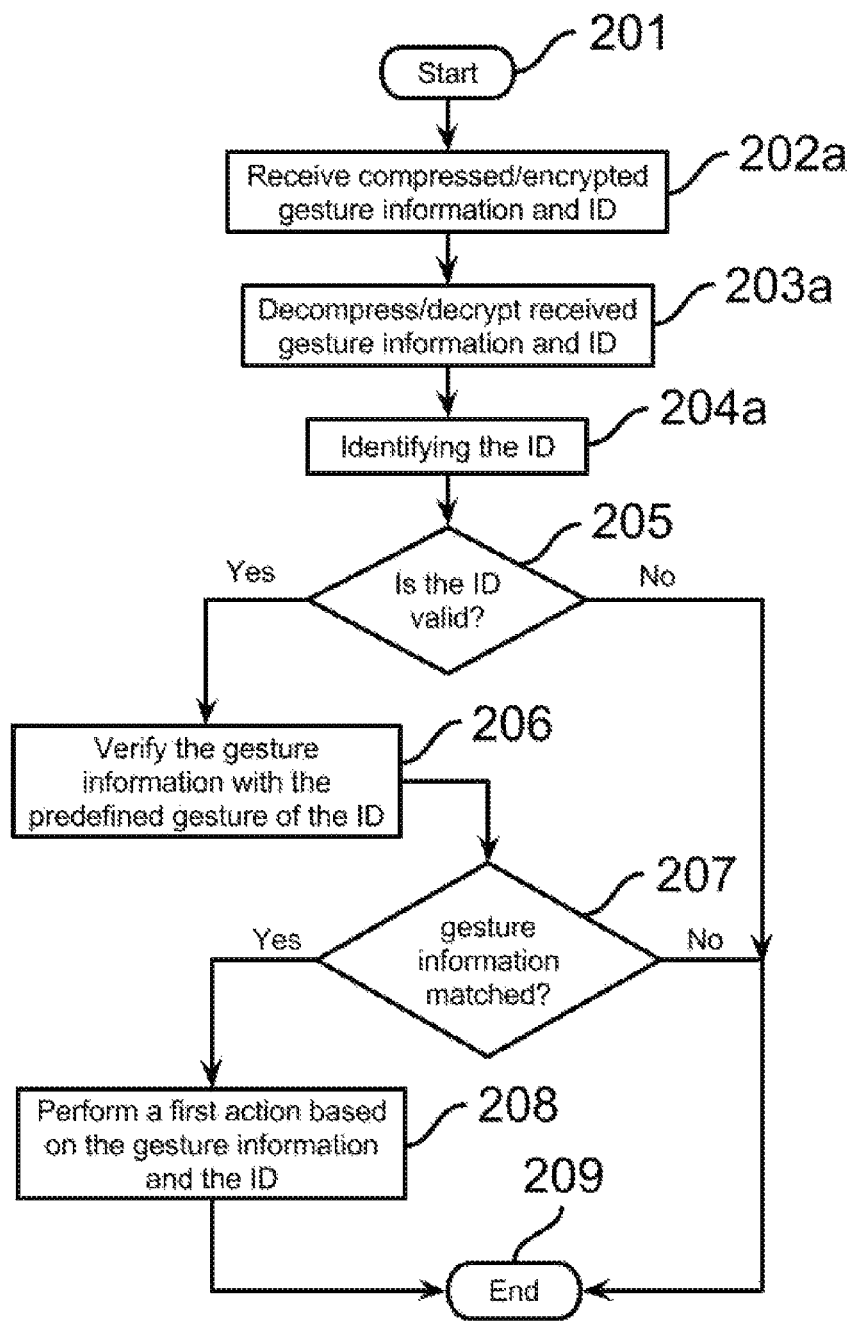

[Fig. 2B]
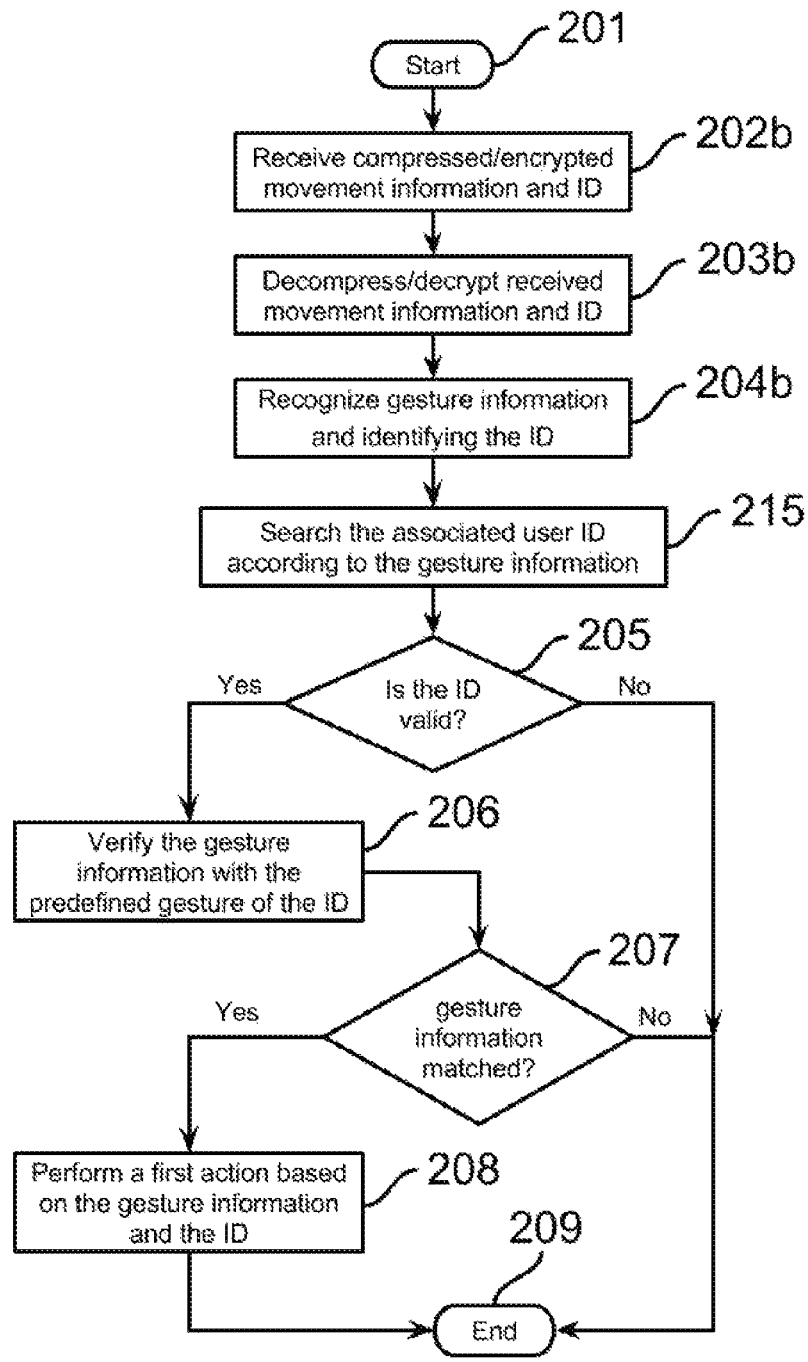

[Fig. 3A]
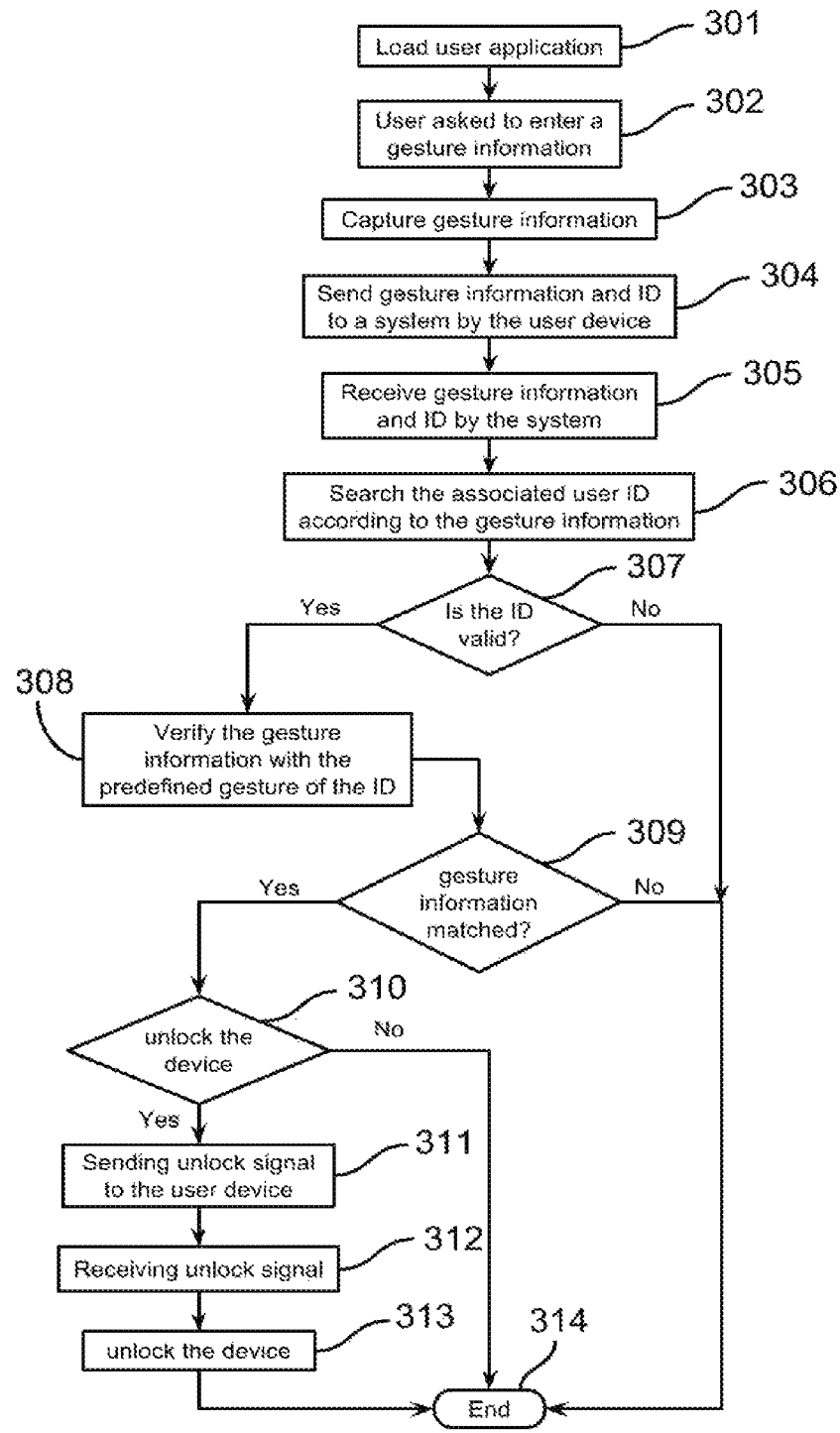

[Fig. 3B]
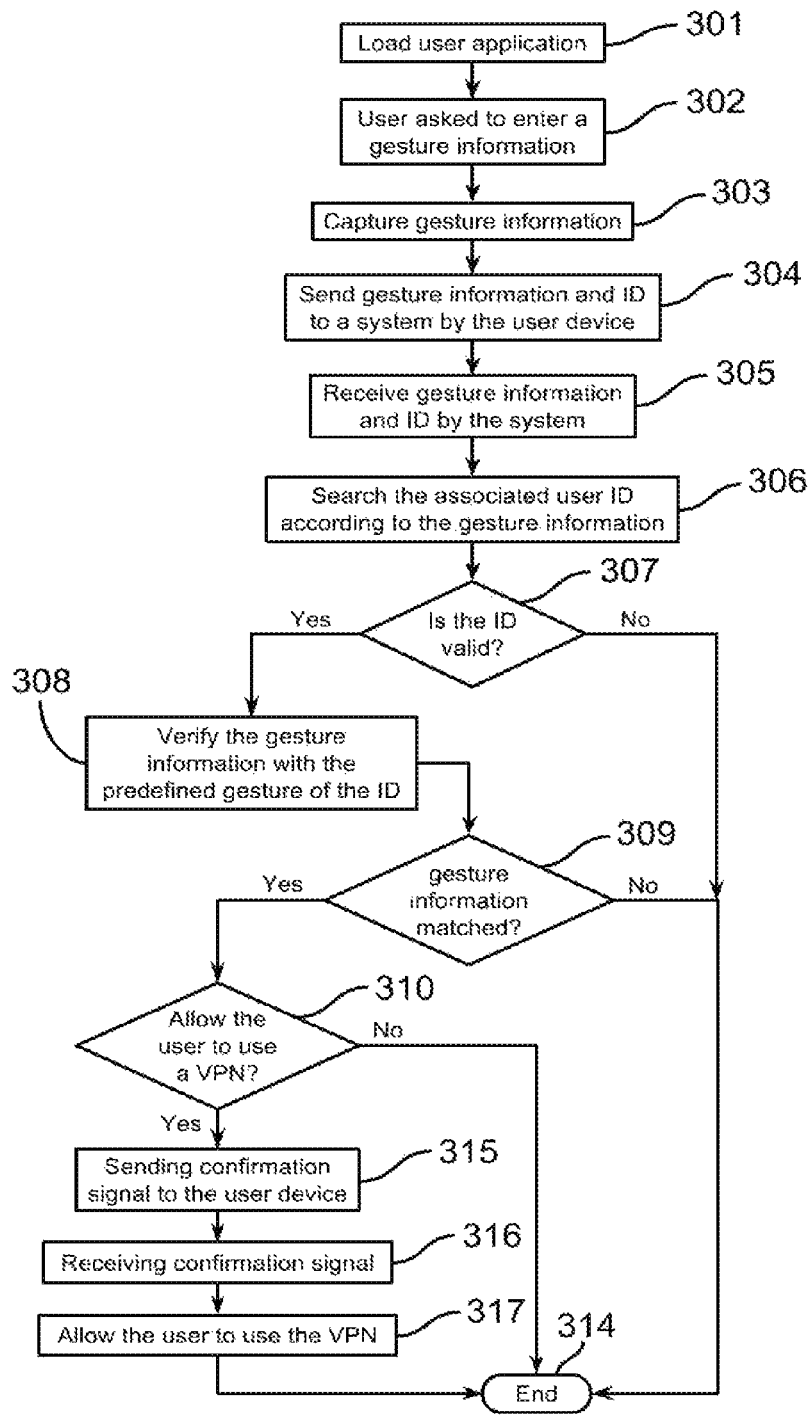

[Fig. 4]
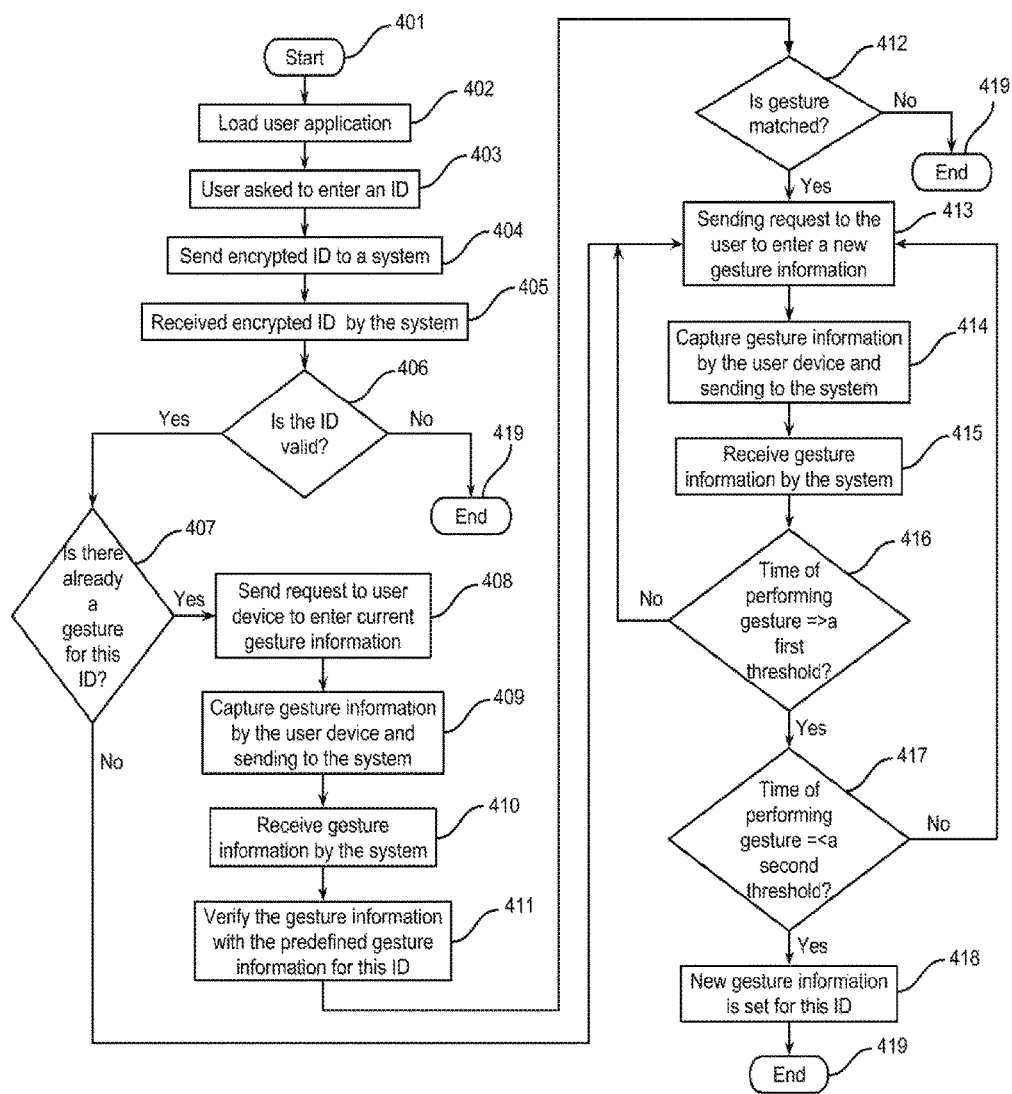

[Fig. 5]
| User ID | Password | Action to perform |
|---|---|---|
| ID1 — 501a | gesture 1 — 502a | unlock door — 503a |
| ID2 — 501b | gesture 2 — 502b | unlock a door and send alarm signal to security guard — 503b |
| ID3 — 501c | gesture 3 — 502c | connect to an office network through a VPN — 503c |
| ID4 — 501d | gesture 4 — 502d | unlock mobile phone — 503d |
[Fig. 6]
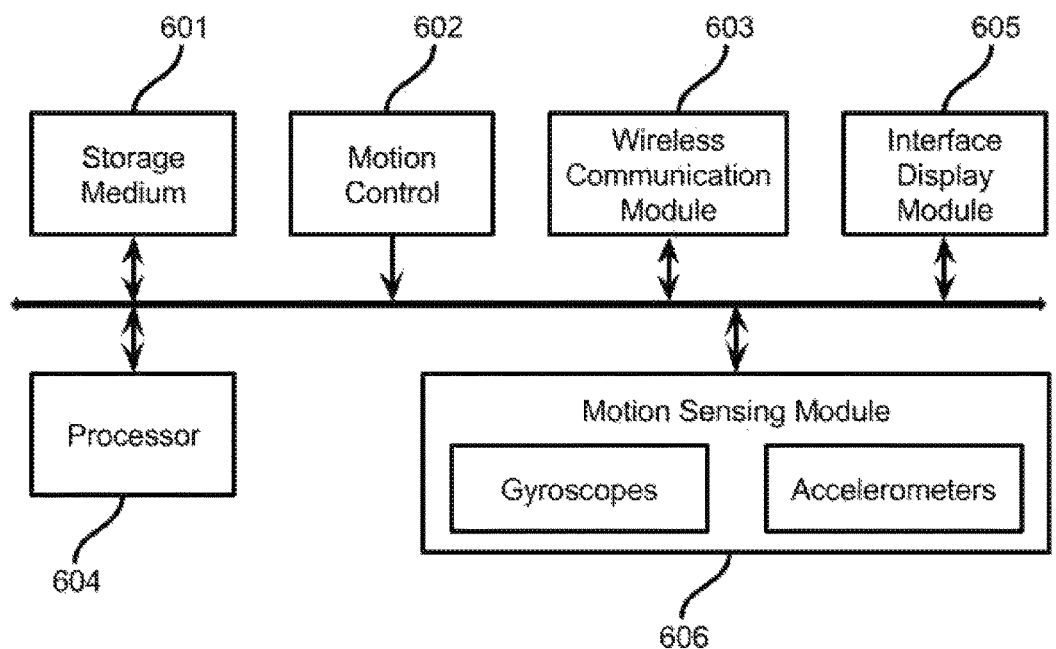

[Fig. 7A]
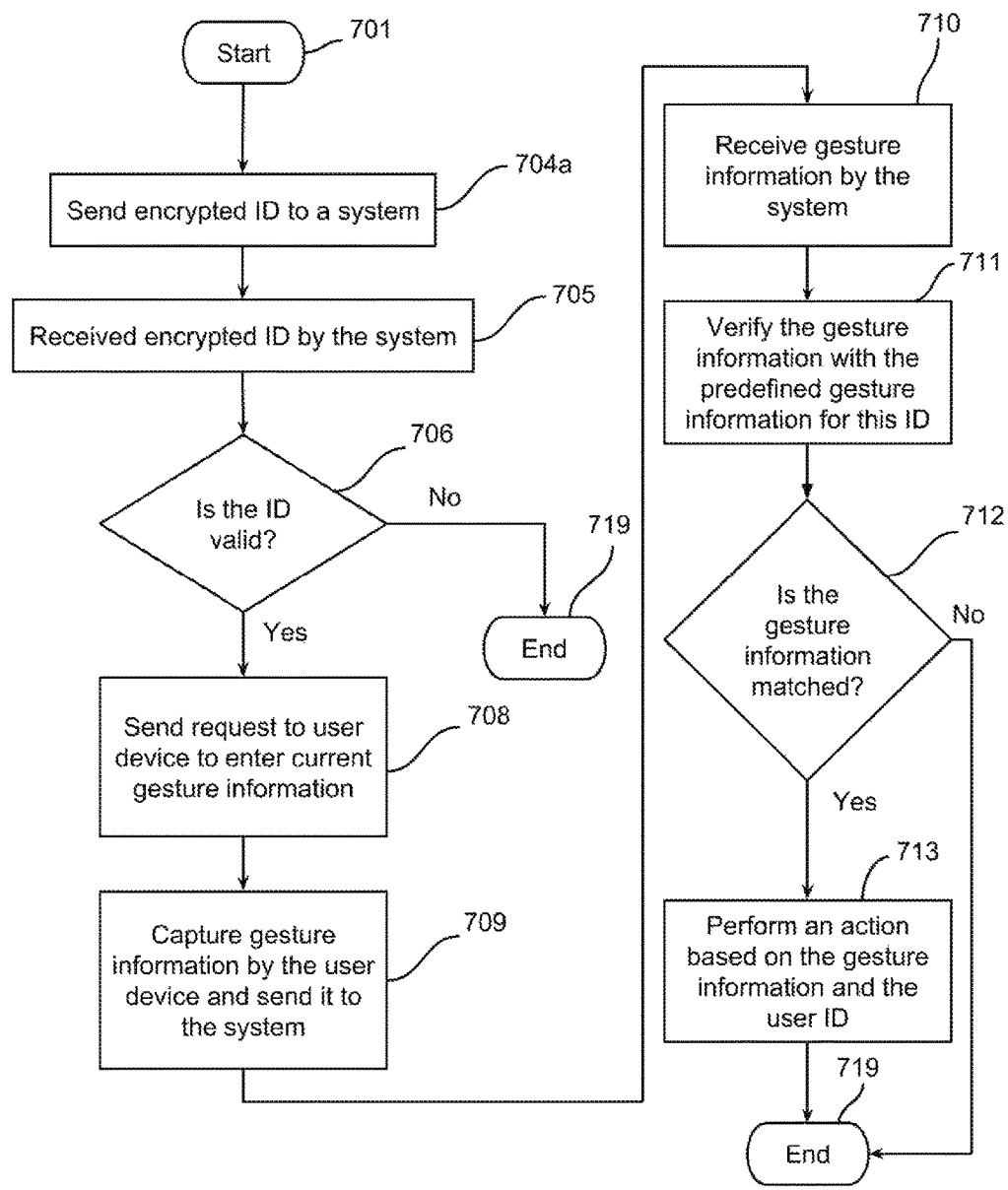

[Fig. 7B]
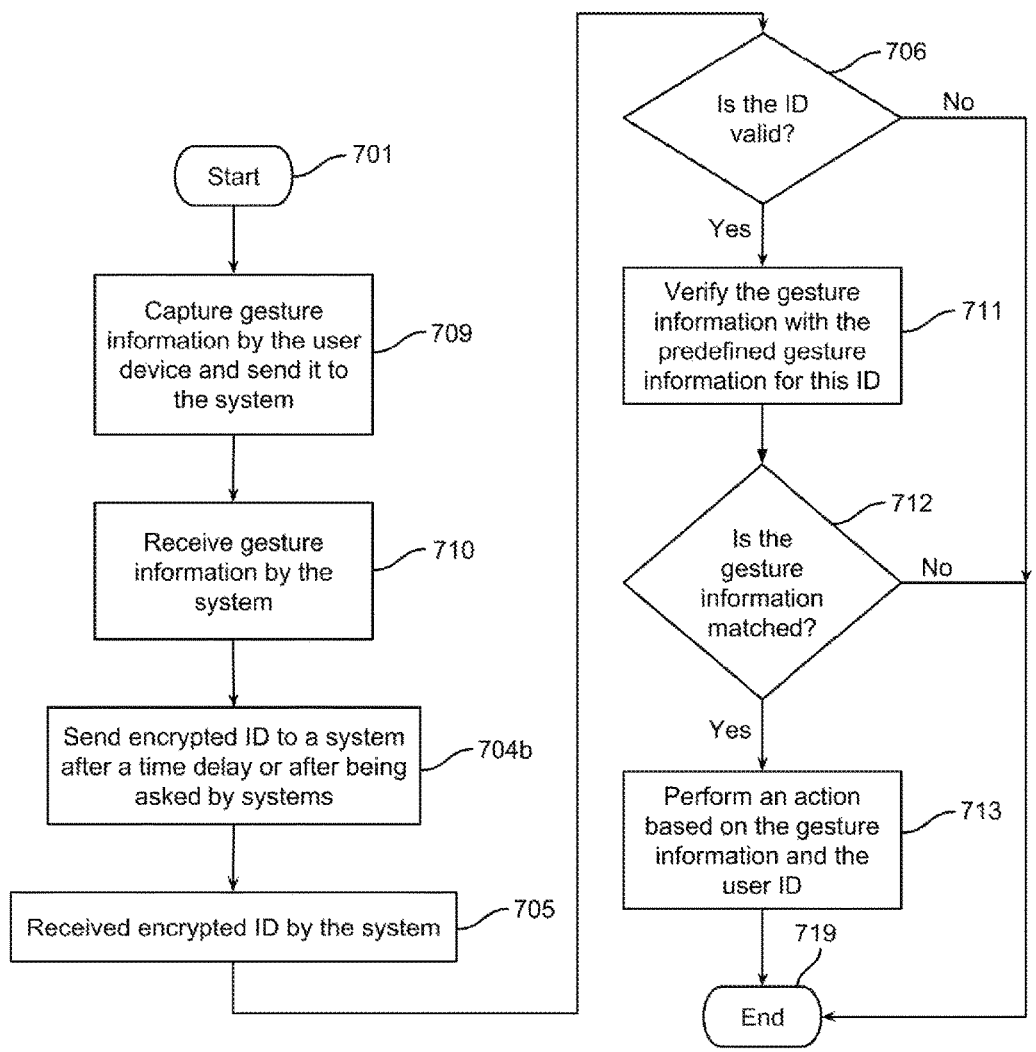

[Fig. 8 (Prior art)]
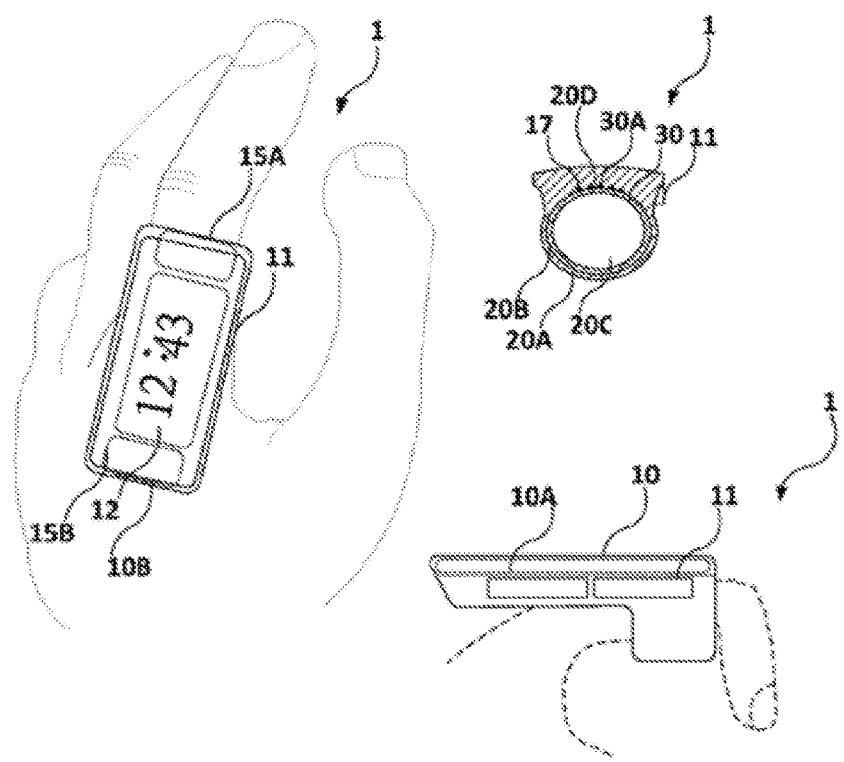

[Fig. 9 (Prior art)]
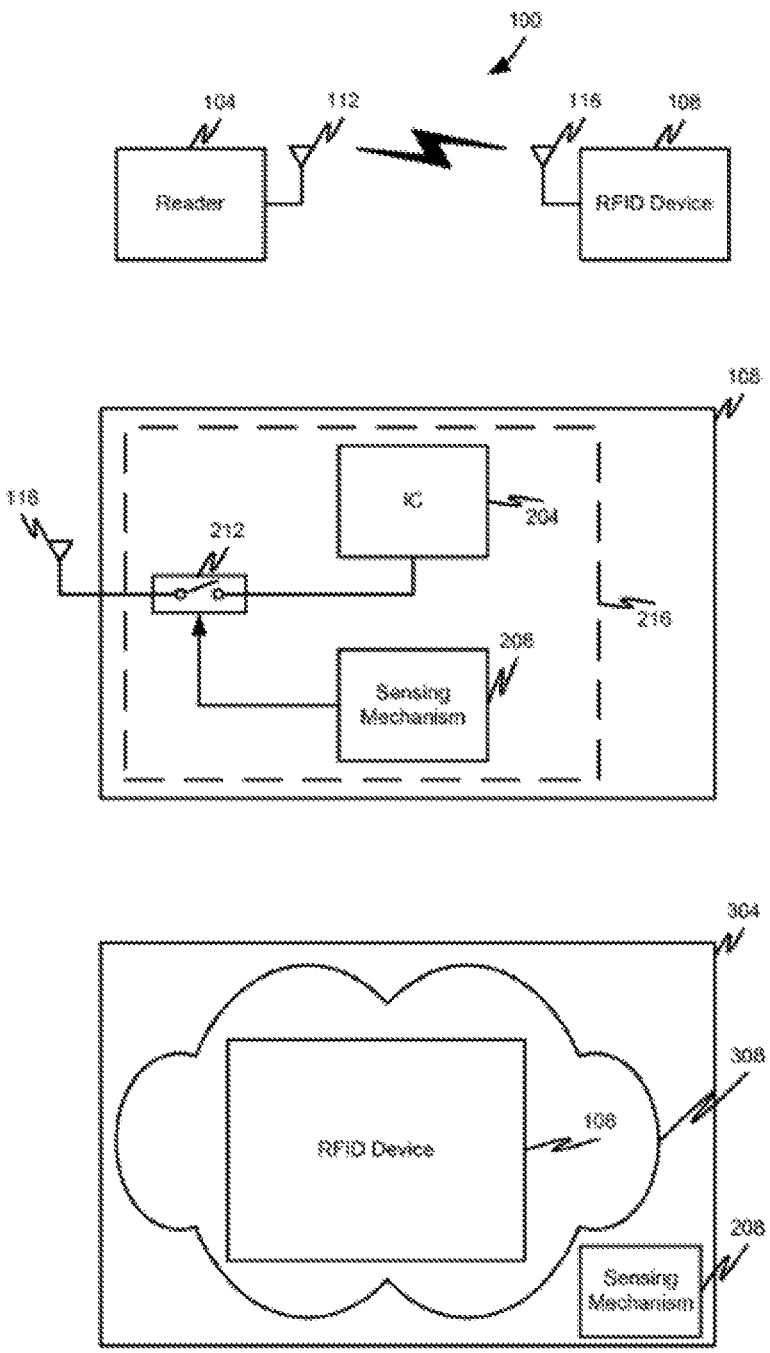

[Fig. 10 (Prior art)]

| Movement 1 | Movement 2 | Movement 3 | Action |
|---|---|---|---|
| ↓ | ← | ↓ | Allow Data To Be Read |
| ↑ | ⤵ | | Allow Data To Be Read |
| ⤴ | | | Allow Data To Be Read |
| ↻ X-axis | ↻ Y-axis | ↻ Z-axis | Transmit Canned Message #1 of N |
| ↑ | → | ↑ | Provide Sequence As Password |

METHODS AND SYSTEMS TO PERFORM AT LEAST ONE ACTION ACCORDING TO A USER'S GESTURE AND IDENTITY

TECHNICAL FIELD

The present invention relates to a mobile apparatus directed to the detection of user's gesture and the utilization of said detection information for performing at least one action.

BACKGROUND ART

Computing devices or door or corporate network, e.g., virtual private network in an office may become "locked" to deter unauthorized use according to known methods. Passwords are commonly used as a simple mechanism for enabling user authentication. When a user attempts to receive any one of those services, the user enters the password, typically via a keyboard or a metal key for unlocking a door. If the correct password is entered, the services for the user are unlocked and available for continued use. Some computing devices such as mobile computing devices (e.g., cell phones), include a touch screen. In some of these devices, a touch gesture on the touch screen may unlock or reactivate the device from a sleep state. One problem with this approach is that the gesture will be entered many times and detection of the gesture can be made by someone who has stolen the device by analyzing the touch screen surface. And also when the user holds and operates the phone in one hand, the grip is often loose and subsequently causes accidental drop and damages on the phone. However, for entering a corporate network and to unlock a door, user authentication may depend on whether the user physically near to a system of the office network or accessing remotely, e.g., the system of the office network may prohibit the user from unlocking the door remotely. Furthermore, the system may need user information, e.g., user ID and device information, e.g., device ID to uniquely identify the user.

Some computing devices such as mobile computing devices (e.g., cell phones), include an accelerometer. Typically, the accelerometer is used to detect orientation of the device resulting in a change of the display orientation (portrait or landscape mode), or to detect a shock condition from a fall. In some devices, sensing by the accelerometer of the user shaking the device may result in an action such as answering an incoming phone call. However, such sensed conditions are crude, often indicating merely conditions such as the tilt/orientation of the device or the presence of shock to the device.

US Patent Publication No. 2015/0065090 A1 discloses a wearable ring-shaped electronic device, illustrated in FIG. 8, and the wearable ring-shaped device can perform assigned functions by inputting commands using the gesture or orientation sensors, voice commands, buttons or touch-based gestures where the assigned functions comprises voice dialing, communicating, coupling, exchanging data, controlling remotely, game controlling or playing music with an outside device. Furthermore the ring-shaped device uses a proximity chip to exchange data and ID information with the other nearby proximity chips. This patent also proposes a method of two-factor authentication to increase security when exchanging information between devices. The method is that aside from the ID information in the cell phone, the user has to provide a second means of identification for authentication verification, wherein the second means of identification is stored and verified in the device.

In another US Patent Publication No. 20130234836 discloses an RFID device, illustrated in FIG. 9, which includes a motion sensing mechanism. The motion sensing mechanism is utilized to control access to data on the RFID device to only instances when the holder of the RFID device moves the RFID device in a predefined sequence of motion(s). The RFID device performs motion sensing when it is placed in an RF field generated by a RF reader. Here the motion sensing mechanism senses the predefined motion and then messages will then be transmitted from the RFID device to the RD reader. The message may include sensitive data. Thus, the motion sensing mechanism is utilized to control access to data on the RFID device, illustrated in FIG. 10.

These prior arts fail to disclose a common system for user authentication for different services or to assign multiple actions on a user ID. Hence, a common system and better methods of securing those services are needed.

DISCLOSURE OF INVENTION

Summary of the Invention

The present invention discloses methods and systems for performing at least one action at a security system according to a user's gesture information. In one of the embodiments of the present invention, a user device or a mobile apparatus captures the user's movement information and translate it to gesture information. The mobile apparatus comprises an antenna, a processor, a storage medium, at least one accelerometer, wherein the accelerometer has at least 3 axes. The mobile apparatus compares the gesture information against one or more predefined gesture information and when the gesture information matches predefined gesture information, the mobile apparatus selects a first identity or user identity based on the predefined gesture information. The mobile apparatus then sends encrypted information to a security system through a reader wherein the encrypted information comprises the predefined gesture information, the first identity or user identity, a timestamp, and a device identity. The system performs at least one action according to the encrypted information. When the gesture information does not match any pre-defined gesture information, the mobile apparatus sends a failure notice to the user.

In one of the embodiments of the present invention, the mobile apparatus or device does not send the encrypted information unless the device is physically close to the reader. A first wireless signal strength is used to measure the distance between the mobile apparatus or device and the reader. The storage medium of the mobile apparatus stores a plurality of identities and the first identity is one of the pluralities of identities.

In one of the embodiments of the present invention, the mobile apparatus captures the user's gestures information and sends the identity and the gesture information separately to a system. The identity is either sent before the gesture information or vice versa. The security system checks if the identity is valid after having received the identity. The system then compares the gesture information against one or more predefined gesture information according to the identity when identity is determined to be valid. Then the security system performs at least one action according to predefined gesture information and the identity when the gesture information is determined to be matching the predefined gesture information. The action can be performed by the security system, the mobile apparatus or a second device.

In one variant of the present invention, the mobile apparatus sends the identity before the gesture information. After receiving the identity the security system sends a request to the mobile apparatus for gesture information. Then the mobile apparatus captures the gesture information and sends to the system. The system then compares the gesture information against one or more predefined gesture information according to the identity when identity is determined to be valid. Then the security system performs at least one action according to predefined gesture information and the identity when the gesture information is determined to be matching the predefined gesture information. The identity and the gesture information are encrypted by the mobile apparatus before sending.

In one variant of the present invention, the identity and gesture information are encrypted with a timestamp by the mobile apparatus before sending and the identity and the gesture information are sent at least ten milliseconds apart. The reader and the system may locate on different premises. The identity can be one or more user identities or a device identity or combination of one user identity and one device identity.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, General packet radio service (GPRS), Global System for Mobile Communications (GSM), Enhanced Data rates for GSM Evolution (EDGE), Code division multiple access (CDMA), Wi-Fi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, metropolitan area network (MAN), wide area network (WAN), the public switched telephone network (PSTN), a satellite communication system, a cable transmission system, and/or the like.

FIG. 6 is a block diagram illustrating the system of a user device. The user device comprises motion sensing module (MSM) 606, wireless communication module 603, processor 604, motion control 602, interface display module 605 and storage medium 601. In some embodiments of the present invention, motion control 602 and interface display module 605 are optional.

Motion sensing module (MSM) 606 measure motion or movement of the user device in space. For example, MSM 606 can measure one or more axes of rotation and one or more axes of acceleration of the device. MSM 606 includes motion sensors, including one or more linear motion sensors e.g., accelerometer and/or one or more rotational motion sensors e.g., gyroscope sensors. In one example, only one three axis accelerometer is used to measure the user motion or movement. When the user moves his/her hand, the motion sensing module obtains each acceleration vector and transmits those acceleration vectors to the processor to be analyzed In one of the embodiments of the present invention, one gyroscope and one accelerometer are used to determine the motion or movement of the user device. In one example, multiple gyroscopes and accelerometers are used to determine the motion of the user device. For example, if three gyroscopes and three accelerometers are used, then a 6-axis sensing user device is provided providing sensing in all six degrees of freedom. The motion sensing module can also further be integrated a magnetic sensor to be a multi-axis and inclined-angle sensor. The multi-axis and inclined-angle sensor can detect the position or the orientation of the surface and sense every axial direction of the acceleration for inputting gestures information. Using MSM 606, the user's movement can be shown through a combination of velocity, acceleration, angle, etc. The present invention is not limited to the statements mentioned above. As long as the element is used to sense wrist or finger movement from the user, the element is comprised in motion sensing module.

The wireless communication module comprises a wireless communication chip and a communication antenna. In this embodiment, the wireless communication chip is a Bluetooth chip, though the present invention is not limited to it. As long as a wireless communication chip is coupled to and controlled by the processor for connecting or exchanging data with a remote device or a security system. For example, even though wireless communication module 603 of the present invention utilizes a Bluetooth function, there are many other wireless communication options that can be used, such as 2G, 3G, Wi-Fi, or infrared communication chips. The remote device mentioned above could be a wireless controlled router, cell phone, computer, game system or cell phone base station. The wireless communication module further comprises a proximity data exchange chip. The present invention could use the proximity chip to communicate with other nearby devices of the same type and the communication could be used for exchanging user identity (ID), device identity (ID) and gesture information. Furthermore, the user could use the safe exchange between the proximity chip of the present invention and that of the cell phone to replace the required security measures of passwords, codes, graphs or other bio-sensors of today's cell phones.

Motion sensing module 606 of the user device is used to acquire movement information from the user and transmit the movement information to processor 604 to be analyzed and the processor recognizes the gesture information. The movement information and the gesture information may different such that the movement information may contain unnecessary data. For example, if the gesture information is "triangle", then motion sensing module traces the user's hand before and after the triangle is drawn and add those data in the movement information. Those before and after data are unnecessary data.

Processor 604 then sends the gesture information through the wireless communication module to a remote device or a system, e.g., security system with a user ID, a timestamp and a device identity (ID) e.g., watch ID where the device ID can be the serial number of the device or any number that uniquely identifies the device. The processor analyzes the gesture information and finds the associated user ID by comparing the gesture information against one or more predefined gesture information where the predefined gesture information and the user ID and the device ID is stored in storage medium 601. In one of the embodiments of the present invention, the processor of the user device does not recognize the gesture information and instead of sending gesture information, processor 604 sends movement information to the security system with all the user ID, a timestamp and a device ID.

The sending of a timestamp along with the gesture information and/or ID serves many purposes. One of the purposes to send the timestamp is to indicate the time when the gesture information was created or sent. Similarly, sending the timestamp with the ID allows the server to be informed about the sending time of the ID. Another purpose of using a timestamp is to make eavesdropping and reverse encryption of the encrypted ID and gesture information more difficult. In one example, the timestamp are encrypted with the ID and/or gesture information. Therefore every time when messages comprising the ID and/or gesture information with the timestamp are sent, the messages are different. Messages eavesdropped by a rogue reader or an unauthorized reader cannot be reused because the timestamp cannot be reused. In another example, instead of using encryption, the message and gesture information can be hashed with the timestamp. In one variant, when ID and gesture information are sent separately, the timestamps sent along with the ID and gesture information will also be different. This will make reverse encryption more difficult and eavesdropping more ineffective comparing to sending ID and gesture information together.

In one of the embodiments of the present invention, a pressure sensor or a switch is connected to the processor of the user device and the user device comprises an automatic on/off function. The automatic on/off function switches the user device between an on mode and an off mode by sensing the pressure from a pressure sensor. When in on mode, every element of the device works normally. When in off mode, many elements of the device are turned off to conserve energy. The user device automatically determines whether it should be on or off through the pressure sensor.

In addition to the on/off function, the processor of the present invention also includes an energy conserving function. Gesture information from the motion sensing module can switch the user device between a normal mode and a power conservation mode and during the power conservation mode, some elements or modules of the user device are in a power conservation mode or an off mode, consuming less power than in the normal mode. The normal mode is a mode where each module of the present invention functions normally, but may consume more power. According to this embodiment, the mode changing function switches the device from the power conservation mode to the normal mode according to the gesture information from the motion sensing module, and vice versa.

A motion control, such as a button, can be included in some embodiments to control the input of gestures information to the user device. For example, when a user presses the button, one or more motion sensor(s) activated to detect the user movement. In one of the embodiments of the present invention, motion control 602 block is optional. It should be appreciated by those skilled in the art that there are myriad ways to control the input of gestures information to the user device without using the button.

User device also includes components for assisting processor 604, such as storage medium 601 (RAM, ROM, Flash, etc.) and is coupled with the processor and the motion sensing module through a bus. The processor can be intelligently controlled by one or more programs stored in and retrieved from storage medium 601. The storage medium further stores the user ID and device ID e.g., watch ID. In one of the embodiments of the present invention, storage medium 601 stores the predefined gesture information and their associated user ID. The processor compares the gesture information from the motion sensing module to the predefined gesture information stored in storage medium 601 to find the associated user ID.

According to one embodiment of the present invention, interface display module 605 is an electronic display device for outputting information viewable by the user, but it is not limited to the statement mentioned above. The interface display module is coupled to the processor for displaying information according to the control of the processor. For example, the interface display module can use LED, LCD, or any other display technology to present the information, the present invention is not limited to this embodiment. In one of the embodiments of the present invention, the interface display module is a touch screen and user can input command through the touch screen. For example, user can double tap to on the sensor(s) of the user device or set the user device to the energy conservation mode by the tapping the touch screen by a predetermined number of time. In one of the embodiments of the present invention, interface display module 605 block is optional.

FIG. 1*a* depicts a flowchart showing the steps required to convert movement information to gesture information and sending this gesture information with an associated user ID, a timestamp and a device ID to a security system. In step 102, user enables one or multiple motion sensors of the user device, e.g., watch to detect the movement information of the user's hand. User may enable the sensor(s) by pressing a button attached to the user device or by tapping the touch screen of the watch. In one of the embodiments of the present invention, user device has a touch sensor on the outer edge of the device and user can enable or disable the motion sensor(s) by tapping the touch sensor. In one example, instead of wearing a watch, the user may wear a small device like ring which has one or multiple motion sensor(s) and a touch sensor on the outer edge of the ring. The sensor(s) is disabled when they are not in use to save the energy of the battery of the user device.

In step 103, the motion sensor(s) of the user device capture the movement information of the user hand or finger and movement information to gesture information translation mode is initiated. In this step the user device begins tracking user movement from one or multiple motion sensor(s) such as 3 axis accelerometer, gyroscopes etc. In one variant of the present invention, the watch uses two types of motion sensors simultaneously. For example, one motion sensor is accelerometer while the other is gyroscopes. The purpose of using accelerometer and gyroscopes at the same time is to enhance the sensing of movement for the user. For example, one user may draw a pattern in the air with the device without rotating his wrist, but another user might rotate his wrist while drawing a pattern. The resulting gesture information may be different from user to user.

In step 104, one or combination of multiple predefined gesture information is detected by the processor of the user device by analyzing the movement information from motion sensing module 606. The movement information can be a combination of velocity, acceleration, angle, etc. In one of the embodiments of the present invention, the processor of the user device changes the switching modes of the user device when no predetermined movement information is detected as the time period reaches a threshold value. For example, when the device senses that there has been no movement for thirty seconds, it will switch the mode to power conservation automatically.

In one of the embodiments of the present invention, a string comprises of characters and digits are assigned on one or multiple gesture information. For example, a string, e.g., "$Pass" is assigned to a gesture information, e.g., "gesture 1" as a password. As a result, when the watch detects the "gesture 1", it will create string "$Pass". In this embodiment, instead of sending gesture information, the user device sends the text to the security system with the user ID and device ID.

In step 105*a*, the processor of the user device detects if the gesture information input is completed. This step can be done by tapping the touch screen of the user device by the user or by pressing a button on the user device or touching a touch sensor of the user device. In one variant of the present invention, the user simply shakes his/her hand to give an instruction to the watch that the gesture information input is completed. If it is determined that the gesture input is not completed, the process returns to the step 103 and detects the movement information again. The processing unit or processor of the user device may decide that the gesture information input is completed by checking the amount of time to complete gesture information. For example, if the time for entering the gesture information is more than the predefined time, e.g., 12 seconds, the processor of the user device detects that the gesture information input is completed.

In step 106*a*, the user is asked to submit the constructed gesture information to the security system. In one variant of the present invention, only a notification is shown on the touch screen of the user device and user is asked to submit the gesture information. If the user decides not to submit the gesture information, the process ends at step 110. After the gesture information is submitted, the processor of the user device will look up the associated user ID for this gesture information in step 107. In one of the embodiments of the present invention, one user may have multiple user IDs and the storage medium of the user device stores those user IDs of the user such that one user ID has one specific gesture information assigned to it. For example, if the user device store three user IDs, e.g., ID1, ID2 and ID3, ID1 may have a gesture information assigned to it e.g., "gesture 1", ID2 may have another gesture information, e.g., "gesture 2", and the ID3 may have a combination of two different gestures information like "gesture 1" and a "gesture 2". A user may choose a gesture information which is a combination of two different gesture information for security purpose so that chosen gesture information looks complicated. As a result, it would be hard for a third person to steal the gesture information. In one example, the user has three user ID and only one gesture information assigned to those user ID such that user insert the gesture information one time for user ID1, two times for user ID2 and three times for user ID3. As a result, the user uses only one gesture information and don't need to assign unique gesture information on each user ID.

After step 109*a* or 109*b*, the security system should have received the compressed encrypted gesture information and ID and can then determine whether to perform further actions according to the process illustrated in FIG. 2.

In one variant, step 106*a* and step 106*b* are not needed that the user is not asked to submit the gesture information and movement information respectively. By skipping steps 106*a* and 106*b*, gesture information and movement information can be submitted quicker and the user does not need to perform step 106*a* or 106*b* manually. One of the disadvantages of skipping steps 106*a* and 106*b* is that the user may not want to send the gesture information or movement information if he is simply practicing or is aware of incorrect gesture or movement made.

At step 108*a*, the processor of the user device compress the gesture information to save space of storage medium 601 and help transfer the gesture information quicker to the security system and also encrypt the gesture information with an associated user ID and a device ID to form a message 115*a* as depicted in FIG. 1C. The message comprises with the device ID, the associated user ID and the gesture information. The format of the message 115*a* is shown in FIG. 1C. Then the processor of the user device sends the compressed and encrypted gesture information with the associated user ID and the device ID to the security system by using a wireless technology e.g., Bluetooth, Wi-Fi or by using the Internet at step 109*a*. The user device may or may not directly connect to the security system through the Internet. In case the user device is not directly connected to the security system, it may send the password through another device like personal computer, laptop or any device that can connect to the Internet and send message 115*a* which can be embedded in one or more packets or frames to the security system. If it is determined that the user device does not have any Wi-Fi connection or Bluetooth connection or Internet connection, a notification appears on the screen of the user device and the user is asked to enable any one of those connections.

FIG. 1B depicts a flowchart showing the steps required to send the movement information from motion sensing module 606 with all user IDs, a timestamp and a device ID to a security system. Comparing to FIG. 1A, step 102, 103 are same. At step 105*b*, the processor of the user device detects if the movement information is completed and at step 106*b*, processor 604, detects if the movement information should be submitted. Steps 104 and 107 of FIG. 1A are omitted in FIG. 1B. FIG. 1B should be viewed in conjunction with FIG. 1C. The difference between FIG. 1A and FIG. 1B is that, in FIG. 1A, the processor of the user device sends the gesture information and an associated user ID found to a security system while in FIG. 1B, the processor of the user device does not recognize the gesture information and does not search for associated user ID according to the gesture information. In this embodiment, the processor of the user device sends a message, i.e., message 115*b* to a security system where the message comprises with the device ID, all the user ID and the movement information.

At step 108*b*, the processor of the user device compresses the movement information to save space of storage medium and helps to transfer the movement information quicker to the security system and encrypts the movement information with the user IDs and device ID to form message 115*b*. The format of message 115*b* is shown in FIG. 1C. Then the processor of the user device sends the message to the security system by using a wireless technology e.g., Bluetooth, Wi-Fi or by using the Internet at step 109*b*. The user device may or may not directly connect to the security system through the Internet. In case the user device is not directly connected to the security system, it may send message 115*b* through another device, like personal computer, laptop or any device that has connected to the Internet to the security system. If it is determined that the user device does not have any Wi-Fi connection or Bluetooth connection or Internet connection, a notification is shown on the screen of the user device and the user will be asked to enable any one of those connections.

FIG. 2A is a flowchart illustrating a process according to a plurality of the embodiments of the present invention. In this embodiment, the security system receives the gesture information with the associated user ID, a timestamp and a device ID from the user device. FIG. 2A should be viewed in conjunction with FIG. 1A and FIG. 5.

In one of the embodiments of the present invention, the security system comprises at least one processor and at least one storage medium. Optionally, the security system comprises one or more network interfaces for communicating to other systems and devices. The security system further comprises a reader, e.g., Bluetooth reader, NFC reader or the like for wireless communication and to provide hands-free operation and authentication. The security system is capable of sending and receiving data in a wireless manner using protocols like the Internet Protocol, or IP, and the wireless application protocol, or WAP and may or may not directly connected to the user device. For example, a user device can be a wristwatch and the wristwatch sends the gesture information with an associated user ID and a device ID to the security system through another device, like a PC, a laptop, a reader or any device that is capable of receiving data and sending data through Internet or by using any wireless technology. In one variant of the present invention, the user device compresses and encrypts the gesture information with an associated user ID and a device ID e.g., watch ID. In step 202*a*, the security system receives the compressed and encrypted gesture information. After this step, the processor of the security system decompresses and decrypts the gesture information in step 203*a*. The present invention is not limited to the statements mentioned above. For example, the user device does not compress the gesture information and only encrypts the gesture information. In another example, the user device may send a binary or a text file instead of sending gesture information.

In step 204*a*, the processor of the security system identifies the device ID and the user ID. In one of the embodiments of the present invention, the user ID and the device ID are unique to every user and device respectively. For example, a device has a unique device ID and a user has multiple unique user ID. However, the present invention is not limited to the statements mentioned above. For one example, the user ID is not unique and reusable while the device ID is unique, i.e., every user has a unique device ID. After this step, the processor of the security system verifies the user ID and performs the action assigned to that user ID. In one of the embodiments of the present invention, one or more actions are assigned to a user ID. When the security system identifies the user ID, the processor of the security system performs the assigned action according to the user ID.

FIG. 5 shows how one or more actions and gesture information are assigned to a user ID. User ID column 501 contains a plurality of user ID, e.g., ID1, ID2, ID3 and ID4, password column 502 contains a plurality of gesture information e.g., gesture 1, gesture 2 etc. Column 503 contains the action that is assigned to the user ID. In this embodiment gesture information, e.g., "gesture 1" 502*a* and predefined action, e.g., "unlock door" 503*a* is assigned to a user ID e.g., user ID1. In this example, gesture information is used as a password. In one variant of the present invention, gesture information assigned to a user ID is not reusable i.e., same gesture information cannot be assigned on two user ID since the processor of the security system identifies the user ID based on the gesture information and finds the assigned action and perform accordingly. If a user uses the same gesture information for two different user ID, the security system may attempt to perform two different actions assigned to those two different user ID which may be undesirable. Further it would be hard for the user to define which user ID should be sent by the user device since processor 604 sends the user ID by analyzing the gesture information. For example, when the processor of the security system detects the user ID1, it sends an "open signal" to a door. In one variant of the present invention, multiple actions can be assigned on a single user ID. For example, in block 503*b* contains two actions, i.e., unlock a door and sending an alarm signal to a security guard and these two actions are assigned to user ID2 501*b*. For example, when the user is followed by a third person, the user may want to unlock the door and alarm the security guard at the same time. If these two actions are assigned on a user ID, it would be much easier for the user to perform those two actions by just inputting one gesture information e.g., moving hand in a predefined pattern.

At step 205, the processor of the security system determines the user ID by comparing it against one or more predefined user ID stored in the storage medium of the security system and finds the associated action to perform assigned to that user ID. If it is determined that the user ID is valid, the processor of the security system verifies the gesture information assigned to that user ID by comparing it against one or more predefined gesture information stored in the storage medium of the security system for that user otherwise the process stop at step 209. In one of the embodiments of the present invention, the processor of the security system first identifies the user by identifying the device ID and then verifies the user ID associated with that user. In this embodiment, user ID needs not to be unique and is reusable since the processor only compares the received user ID to all the user ID associated with that user. In one example, the processor compares the received user ID to all user ID associated with all the user. The user ID should be unique and is not reusable. In this example, a user may contain multiple unique user ID, and each user ID can be used to uniquely identify the user.

At step 207, the processor of the security system determines if the gesture information is matched with the predefined gesture information associated with a user ID. If it is determined that the gesture information is matched, the processor performs the associated action assigned to that user ID. For example, if it is determined that ID1 is detected and gesture 1 is matched with the predefined gesture information, the processor sends an "open signal" to a door to unlock the door so that the user can enter into the door. In this embodiment, the processor also saves the entering time of the user. However the present invention is not limited to the statement mentioned above. For example, the assigned action can be unlocking a door and sending an alarm signal to a security guard or any other user defined action assigned to the user ID. In one variant of the present invention, if it is determined at step 207 by the processor of the security system that the gesture information is not matched with the predefined gesture information, the security system sends a failure notice/message to the user which reports the failure. The failure notice can be a sound, a bell, an email or a flashing LED etc.

FIG. 2B depicts a flowchart showing the steps required to identify a user ID and perform the associated action(s) assigned to that user ID. FIG. 2A and FIG. 2B are similar, except step 202*b*, 204*b* and step 215. FIG. 2A should be viewed in conjunction with FIG. 18 and FIG. 5. At step 202*b*, instead of receiving one user ID and the gesture information, the security system receives a plurality of the user ID and the movement information associated with a user. In step 203*b*, the processor of the security system decompresses and decrypts the movement information, user ID and device ID. Step 204*b* comprises of steps 104 of FIG. 1A and 204*a* of FIG. 2A.

In this embodiment, the processor of the security system looks up associated user ID by analyzing the gesture information at step 215 and each user ID has unique gesture information. In one example of the present invention, gesture information is used as password and each user has multiple unique gestures information. After detecting the user ID, the processor of the security system detects if the user ID is valid by comparing it against one or more predefined user IDs for that user which is stored in the storage medium of the security system. Steps 206, 207 and 208 of FIG. 2B are same as FIG. 2A.

In one variant of the present invention, a wireless signal strength received from the user device can be determined at step 202*a* and 202*b*. The determination can be made by the security system. The strength of the wireless signal can be used by the system to estimate the position of the user device. A determination can be made as to whether the user device is already engaged in an active wireless communication session with the system. If the system recognizes the user device as one that is already engaged in an active wireless communication session with the system, the system will monitor the user device. Once the wireless communication session is activated, the system will continue to monitor the signal strength that the system receives from the user device. If the system detects the signal strength, becoming weaker, indicating that the user device is moving away from the system, the system can terminate the wireless communication session, if the signal strength falls below a predetermined threshold level. However, those skilled in the art will appreciate that there are myriad ways to determine the wireless signal strength by the system.

FIG. 3A depicts a flowchart showing the steps required unlocking a user device or how a second device is being unlocked by using the user device by using gesture information and a user ID. In this embodiment the user device can be a watch, mobile phone, a laptop or any mobile apparatus/device that is capable of sending and receiving data in a wireless manner using protocols like the Internet Protocol, or IP, and the wireless application protocol, or WAP and also has one or more motion sensors to detect the user movement. And the second device can be a watch, mobile phone, a PC, a laptop or any mobile apparatus/device that is capable of sending and receiving data in a wireless manner using protocols like the Internet Protocol (IP), and the wireless application protocol (WAP).

In one example, a watch is used to unlock a personal computer (PC). The watch sends a gesture information, an associated user ID and a device ID to the PC by using a wireless technology, e.g., Wi-Fi, Bluetooth, etc., and the PC sends the gesture information, the associated user ID and the device ID to the security system by using the Internet or any wireless technology. The security system, then verifies the gesture information and the user ID where the assigned action to the user ID is to unlock the PC. Then the security system sends an "unlock signal" to the PC and the PC is unlocked. The benefits of this example are that an administrator of the security system can define which user is allowed to unlock the PC and thus provides extra security level and flexibility.

FIG. 3A should be viewed in conjunction with FIG. 1A, FIG. 2A and FIG. 2B. At step 301, a user first loads an app in his/her device. At step 302, user is asked to enter a gesture information when the user attempts to unlock the user device e.g., mobile phone. In one of the embodiments of the present invention, when the user picks up the user device, the user device automatically senses the movement of the user and one or more motion sensor e.g., 3 axis accelerometer is activated to detect the user movement. Steps 303 and 304 are comprised of steps 103-109*a* of FIG. 1A. In one variant of the present invention, steps 302-304 comprises of steps 102-109*b* of FIG. 1B. In this variant, the processor of the security system detects the gesture information from the movement information at step 305.

At step 304, user device, e.g., mobile phone sends gesture information, an associated user ID, a timestamp and a device ID to a security system. In this embodiment, the device ID is the user device ID, e.g., mobile phone ID. The present invention is not limited to the embodiments stated above. For one example, a watch is used to capture the user movement and sends this information to the security system through the second device such as a mobile phone. If the gesture information matches a predefined gesture information, then the mobile phone is unlocked. The security system, sends an unlock signal to the mobile phone to unlock the mobile phone by analyzing the gesture information and the user ID. In this embodiment, step 301, 302, 304 is performed by mobile phone, step 303 is performed by the watch, step 305-311 is performed by the security system and step 312-313 performed by the mobile phone.

At step 306, the processor of the security system lookup associated user ID by analyzing the gesture information. In one of the embodiments of the present invention, the user device sends only one user ID with the gesture information. In this embodiment, step 306 is omitted.

At step 307, the security system detects and verifies the user ID by comparing it against one or more predefined user IDs. Step 307, 308 and 309 are the same as steps 205, 206 and 207 of FIG. 2A. These steps are also performed by the security system. In step 310, the security system determines which action to perform by analyzing the user ID. For example, if the security system detects ID4 501*d*, it performs the action 503*d* as depicted in FIG. 5 which is "unlock mobile phone". If it is determined to unlock the mobile phone, the processor of the security system sends an "unlock signal" to the mobile phone in step 311. At step 312, mobile phone receives the "unlock signal" and at step 313, the device will be unlocked. The decision of unlocking the mobile phone is made by the security system not by the mobile phone itself. Thus the security system provides security and flexibility to the user. The data stored in the security system can be updated remotely by the user.

FIG. 3B depicts a flowchart showing the steps required to allow a user to enter into a corporate network through a VPN (Virtual Private Network) of an office network through a company device by using gesture information and user ID in one example of the present invention. Steps 301-310 of FIG. 3B are the same as steps 301-310 depicted in FIG. 3A. In one variant of the present invention, steps 302-304 comprises of steps 102-109*a* of FIG. 1A. At step 310, the processor of the security system determines if the action assigned to the user ID should be performed or otherwise the process stops at step 314. If it is determined to perform the associated action, the processor of the security system sends a confirmation signal at step 315. At step 316, the user device receives the confirmation signal and allows the user to enter the VPN of an office network at step 317.

For example, if the processor of the security system detects the user ID3 501*c*, it allows the user to enter the VPN of office network. In one example, the user uses the company device, e.g., watch for entering the VPN of office network and the watch is used to detect the user movement and translates this movement information to gesture information and sends this gesture information to a desktop/laptop with an associated user ID and a device ID, where the watch is connected to the desktop/laptop by using wireless technology, e.g., Bluetooth, Wi-Fi etc. The desktop/laptop receives the gesture information and sends this gesture information to the security system. The security system verifies the gesture information by comparing the gesture information against one or more predefined gesture information stored in the storage medium of the security system. If the gesture information is matched with the predefined gesture information, the security system then verifies the associated user ID and performs assigned action on that user ID. If the user ID is verified, then the security system sends a confirmation signal, which is the assigned action, to the desktop/laptop and the user can enter the office network through the VPN.

However, the present invention is not limited to the statement mentioned above. For example, the company device can be a watch, mobile phone, a laptop or any mobile device that is capable of sending and receiving data in a wireless manner using protocols like the Internet Protocol, or IP, and the wireless application protocol, or WAP and also has one or more motion sensors to detect the movement.

FIG. 4 depicts a flowchart showing the steps required to set new gesture information for a user ID in one of the embodiments of the present invention. In step 402, an app is loaded in user device. In one variant of the present invention, the app is loaded in the second device which is used to send gesture information to a system, e.g., security system and the user device is used to detect the user movement. For example, a watch is used to detect the user movement and sends gesture information to the security system through a laptop. In this embodiment, a user app is loaded on the laptop, and the user can remotely update gesture information by using the Internet independently or through the second device. In this example, instead of sending a user ID, a device ID and the gesture information at the same time, the user only sends one user ID and the device ID, although the present invention is not limited to the statement mentioned above. For example, the user may send only one user ID when the user ID is capable of uniquely identifies the user. The benefits of sending only one user ID is that the size of the message sent from the user device is reduced. The security system verifies the user ID and when the user ID is verified, a request is sent to the user device by the security system to enter the gesture information associated with the user ID.

At step 403, the user is asked to enter the associated user ID for setting new gesture information for this user ID. At step 404, the user enters the associated user ID. The user device encrypts user ID and sends this encrypted user ID to the security system. In one example, the user ID and device ID of the user device are encrypted. The user device then sends this encrypted user ID and device ID to the security system and the security system receives this encrypted user ID and device ID at step 405.

At step 406, the security system verifies the received user ID by comparing it against one or more predefined user ID associated with that user. In one example, the security system identifies the user by analyzing the device ID of the user device. In step 407, the processor of the security system detects if there is already a gesture information assigned to this user ID. If it is determined that there is already a gesture information assigned to this user ID, the security system sends a request to the user device to capture or to create a gesture information to this user ID in step 408 or the process returns to step 413. At step 409, user device captures the user movement and gesture information, compresses and encrypts the gesture information and sends this gesture information to a system e.g., security system. In one example, user device, e.g., a watch captures the user movement and gesture information and sends this gesture information to another device, e.g., laptop, by using wireless technology and the laptop is used to send this gesture information to the security system by using wired or wireless connection, e.g., the Internet. In one variant of the present invention, user device compresses and encrypts the gesture information and the device ID of the user device. Steps 102-106*a* of FIG. 1A is also performed at step 409. At step 410 the security system receives encrypted, compressed gesture information and the device ID.

At step 411, the security system verifies the gesture information with the predefined gesture information associated with that user ID. If it is determined that the gesture information is matched at step 412, the user is authenticated by the processor of the security system. Then the processor of the security system sends a request to the user device to send new gesture information for this ID or otherwise the process stops at step 419. In one variant of the present invention, if it is determined at step 412 that the gesture information is not matched with the predefined gesture information, the processor of the security system sends a failure notice/message to the user device. The failure notice is based on the gesture information and the device identity. Step 414 is same as step 409. At step 415, the security system receives the encrypted gesture information and decrypts the gesture information. At step 416, the processor of the security system detects the period of time used to perform the gesture information by checking the timestamp.

If the time for performing gesture information is less than a first threshold e.g., 3 seconds, the process return to step 413 or otherwise step 417 performed. At step 417, the processor of the security system detects if the time of performing gesture information is more than a second threshold, e.g., 12 seconds, the process return to step 413 or otherwise new gesture information is set for this user ID in step 418. The newly update predefined gesture information can then be used in next authentication at step 411.

FIG. 7A depicts a flowchart showing the steps required to perform one or more actions at the system according to a user ID and gesture information. The user device is not required to send the gesture information along with the user ID. Instead, the gesture information is sent after the user ID is accepted by the system. This arrangement is to reduce the risk that the gesture information is being sent to a rogue reader that impersonate a reader of the security system by not sending the ID and gesture information at the same time. A rogue reader may be able to record the motion by eavesdropping RF signal communication between the reader and the user device. It is preferred that that the user ID and gesture information are sent at least ten milliseconds apart in order to reduce the risk for the rogue reader to read the user ID and gesture information together or associate the user ID with the gesture information.

Although this embodiment is used by a security system, similar to other embodiments in the present invention, there is no limitation that only a security system can implement the present invention. The present invention can also be applied to system that require user ID and gesture information, such as multiplayer game console that gamers' body movement can be used as gesture information and the gamers' controller can be considered as the mobile device.

Some of steps of FIG. 7 are similar to some steps of FIG. 4. At step 704a, the user device sends an encrypted user ID to the security system through the reader. The reader is not limited to an RFID reader. For example, the user may enter his ID at a terminal or by allowing a camera to capture his facial information or by placing his thumb at a fingerprint reader. The reader may not be located near to the security system. For example, the reader may be a device connected to the user device at the user's premise, such a USB fingerprint reader. The ID is encrypted before sending to the security system. In one variant, the user ID is a device ID. For example, the user present his RFID card to the reader and the RFID card is embedded with a device ID. The device ID is sent to the reader at step 704a.

After security system has received the encrypted ID at step 705, it will ask the user device to send the gesture information at step 708 if the ID is valid at step 706. If the ID is not valid, the process stops at step 719. In one variant, the user device may ask the user to enter the ID again and then perform step 704 again. The security system determines whether the ID is valid at step 706 by looking up the ID in its database or records. In details, when the ID is valid, the system will send a message to the user device that the ID is valid, such that the user device can then send the gesture information. If the user device has not received the message from the security system, the user device should not send the gesture information.

At step 709, the user device captures the user's gesture information and then sends the gesture information to the security system. The gesture information may be encrypted first before being sent. The user may start creating gesture information after receiving the request from the user device. In one variant, the user may have created the gesture information and the user device may have already captured the gesture information before step 708. But the gesture information is not sent to the security stem before step 708. This allows the user to enter his ID and to create gesture information in a non-stopping manner for better user experience. However the gesture information is not sent until the ID is verified.

At step 710, the security system receives the gesture information from the mobile device. At step 711, it verifies the gesture information against a database storing predefined gesture information according to the ID that received earlier at step 705. If the gesture information matches one of the predefined gesture information of the ID, the gesture information is considered as matched at step 712. An action can then be performed by the security system or the user device at step 713. When the action is performed at the user device and/or a second device, security system sends a message to the user device and/or the second device at 713 respectively. In one example, at step 713, the security system sends "confirm signal" to the user device and/or the second device and allows a user to enter into a corporate network through a VPN of an office network although the present invention is not limited to the statement mentioned above. For example, instead of sending "confirm signal", the security system may send "unlock a signal" to a door to open the door or "alarm signal" to a security guard. In one variant of the present invention, the security system does not allow a user to unlock a door if it is determined that the user device is not within the range of wireless signal strength of the security system.

There is no limitation that the encrypted ID must be sent before gesture information. When gesture information is sent before the encrypted ID, the sequence of steps 709-710 are performed before steps 704 as illustrated in FIG. 7B. In FIG. 7B, step 708 can be omitted as the user may determine when to start the capturing of gesture information. Further step 704b replaced step 704a, such that the encrypted ID is sent to the system after a time delay, for example 1 second, or after being asked by the security system. This is to ensure that the gesture information and encrypted ID are sent separately.

In one variant, between the time that the user ID and gesture information are sent, random data or RF signal can be transmitted by the user's device to the reader. This will create difficulty for the rogue reader to determine when the user ID and gesture information are sent. Further, random data or RF signal can also be transmitted by the user's device to the reader and by the reader to the user's device before, after and during the sending of user ID and gesture information. This will likely create more confusion to the rogue reader to determine the beginning and end of the user ID and gesture information transmission. In one variant the random data or RF signal does not need to be random. Any useless data can be used as random data or RF signals to confuse the rogue reader. The terms mobile apparatus and user's device are used interchangeably for embodiments in the present invention

BRIEF DESCRIPTION OF DRAWINGS

FIG. 1A is a flowchart showing the steps required to convert movement information to gesture information and sending this gesture information with an associated user ID and a device ID to a security system.

FIG. 1B is a flowchart showing the steps required to send the movement information from motion sensing module 606 with all user IDs and a device ID to a security system.

FIG. 1C is a block diagram showing the format of the message sent from the user device to security system.

FIG. 2A is a flowchart illustrating a process according to a plurality of the embodiments of the present invention where the security system receives the gesture information with the associated user ID and a device ID from the user device and perform assigned action.

FIG. 2B is a flowchart showing the steps required to identify a user ID and perform the associated action(s) assigned to that user ID.

FIG. 3A is a flowchart showing the steps required unlocking a user device or how a second device is being unlocked by using the user device by using gesture information and a user ID.

FIG. 3B is a flowchart showing the steps required to allow a user to enter into a corporate network through a VPN (Virtual Private Network) of an office network through a company device by using gesture information and user ID.

FIG. 4 is a flowchart showing the steps required to set new gesture information for a user ID.

FIG. 5 is a block diagram showing how one or more actions and gesture information are assigned to a user ID.

FIG. 6 is a block diagram illustrating the system of a user device.

FIG. 7A is a flowchart showing the steps required to perform one or more actions where the actions are assigned to a user ID and the gesture information is sent after the user ID is accepted by the system.

FIG. 7B is a flowchart showing the steps required to perform one or more actions where the actions are assigned to a user ID and the gesture information is sent before the encrypted ID.

FIG. 8 is a schematic diagram of the wearable electronic device according to prior art (U.S. patent application Ser. No. 14/471,868).

FIG. 9 is a block diagram depicting an alternative configuration of an RFID device holder according to prior art (U.S. patent application Ser. No. 13/867,634).

FIG. 10 is a table depicting exemplary motions and their associated actions according to prior art (U.S. patent application Ser. No. 13/867,634).

The invention claimed is:

1. A method of performing at least one action at a system according to a user's gesture information, comprising:
   a. capturing the user's movement and converting the user's movement to captured gesture information by a mobile apparatus, wherein the mobile apparatus comprises an antenna, a processor, a storage medium and at least one accelerometer, wherein the accelerometer has at least three axes;
   b. comparing the captured gesture information with one or more predefined gesture information at the mobile apparatus;
   c. when the captured gesture information matches a predefined gesture information, at the mobile apparatus:
      i. selecting a first identity based on a matched predefined gesture information;
      ii. when the mobile apparatus is physically close to a reader by a first wireless strength signal:
         A. generating an encrypted information, wherein the encrypted information comprises the predefined gesture information used in step (b) for comparison with the captured gesture information in step (a), a first identity, a timestamp, and a device identity;
         B. sending the encrypted information to a security system through a reader, wherein the mobile apparatus is physically close to the reader;
         C. performing the at least one action at the security system according to the encrypted information; and
   d. when the captured gesture information does not match any predefined gesture information, at the mobile apparatus:
      sending a failure notice to the user.

2. The method according to claim 1, wherein steps (c)(ii)(B) and (c)(ii)(C) are performed after the user has been asked whether to submit the captured gesture information and the user has decided to submit the captured gesture information.

3. The method according to claim 1, wherein the mobile apparatus stores a plurality of identities and the first identity is one of the pluralities of identities; and the at least one action is performed by a second device.

4. A method of performing at least one action according to a user's gesture information and an identity, comprising:
   a. capturing, at a mobile apparatus, the user's movement and converting the user's movement to captured gesture information, wherein the mobile apparatus comprises an antenna, a processor, a storage medium and at least one accelerometer, wherein the accelerometer has at least three axes;
   b. sending, at the mobile apparatus, the identity and the captured gesture information separately to a security system through a proximity chip; wherein the identity is sent before the captured gesture information or vice versa;
   c. checking, at the security system, whether the identity is valid after having received the identity;
   d. comparing, at the security system, the captured gesture information against one or more predefined gesture information according to the identity when the identity is determined to be valid at step (c); and
   e. sending a message, at the security system, to a second device according to the predefined gesture information and the identity, when the captured gesture information is determined to be matching the predefined gesture information at step (d); and performing the at least one action at a second device according to the message.

5. The method according to claim 4, wherein the identity is sent before the captured gesture information, and the method further comprising:
   f. sending, at the security system, a request to the mobile apparatus for creating a new captured gesture information;
   g. prompting, at the mobile apparatus, a user to create the new captured gesture information;
   h. creating, at the mobile apparatus, the new captured gesture information;
   i. sending, at the mobile apparatus, the new captured gesture information in step (g) to the security system; and
   wherein steps (f)-(i) are performed before step (c).

6. The method according to claim 4, wherein the identity and captured gesture information are encrypted before sending.

7. The method according to claim 4, wherein the identity and a first timestamp are comprised in a first message and the first message is encrypted before being sent; and wherein the captured gesture information and a second timestamp are comprised in a second message and the second message is encrypted before being sent.

8. The method according to claim 4, wherein the identity and the captured gesture information are sent at least ten milliseconds apart.

9. The method according to claim 4, wherein the security system and the reader are located at different premises.

10. The method according to claim 4, wherein the identity is a user identity.

11. The method according to claim 10, wherein the user has a plurality of user identities.

12. The method according to claim 4, wherein the identity is a device identity.

13. A system of performing at least one action according to a user's gesture information, wherein the system comprises a mobile apparatus, a reader, and a security system; wherein the security system comprises at least one first processor, and at least one first storage medium; wherein the mobile apparatus comprises an antenna, a second processor, a second storage medium and at least one accelerometer; wherein the accelerometer has at least three axes; wherein the second storage medium stores program instructions executable by the at least one second processor for:

a. capturing, at the mobile apparatus, the user's movement and converting the user's movement to captured gesture information;

b. sending, at the mobile apparatus, the identity and the captured gesture information separately to the security system through a proximity chip; wherein the identity is sent before the captured gesture information or vice versa;

wherein the at least one first storage medium stores program instructions executable by the at least one first processor for:

c. checking, at the security system, whether the identity is valid after having received the identity;

d. comparing, at the security system, the captured gesture information against one or more predefined gesture information according to the identity when the identity is determined to be valid at step (c); and e. sending a message, at the security system, to a second device according to a predefined gesture information and the identity when the captured gesture information is determined to be matching the predefined gesture information at step (d); and performing the at least one action at a second device according to the message.

14. The system according to claim 13, when the wherein the identity is sent before the captured gesture information, and further comprising:

f. sending, at the security system, a request to the mobile apparatus for creating a new captured gesture information;

g. prompting, at the mobile apparatus, a user to create the new captured gesture information;

h. creating, at the mobile apparatus, the new captured gesture information;

i. sending, at the mobile apparatus, the new captured gesture information in step (a) to the security system; and wherein steps (f)-(i) are performed before step (c).

15. The method according to claim 13, wherein the identity and captured gesture information are encrypted before sending.

16. The method according to claim 13, wherein the identity and a first timestamp are comprised in a first message and the first message is encrypted before being sent; and wherein the captured gesture information and a second timestamp are comprised in a second message and the second message is encrypted before being sent.

17. The method according to claim 13, wherein the identity and the captured gesture information are sent at least ten milliseconds apart.

18. The method according to claim 13, wherein the security system and the reader are located at different premises.

19. The method according to claim 13, wherein the identity is a user identity.

20. The method according to claim 19, wherein the user has a plurality of user identities.

* * * * *